(12) United States Patent
Wang et al.

(10) Patent No.: US 11,082,354 B2
(45) Date of Patent: Aug. 3, 2021

(54) ADAPTIVE POLLING IN SOFTWARE-DEFINED NETWORKING (SDN) ENVIRONMENTS

(71) Applicant: VMware, Inc., Palo Alto, CA (US)

(72) Inventors: Dexiang Wang, Sunnyvale, CA (US); Eduard Serra Miralles, Redwood City, CA (US); Yong Wang, San Jose, CA (US); Mani Kancherla, Cupertino, CA (US); Binggang Liu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/439,689

(22) Filed: Jun. 12, 2019

(65) Prior Publication Data

US 2020/0396172 A1 Dec. 17, 2020

(51) Int. Cl.
*H04L 12/873* (2013.01)
*H04L 12/12* (2006.01)

(52) U.S. Cl.
CPC ............ *H04L 47/522* (2013.01); *H04L 12/12* (2013.01)

(58) Field of Classification Search
CPC . H04L 47/2441; H04L 12/1439; H04L 47/10; H04L 47/125; H04L 47/20
See application file for complete search history.

(56) References Cited

U.S. PATENT DOCUMENTS

| | | |
|---|---|---|
| 6,735,629 B1 | 5/2004 | Cafarelli, III et al. |
| 10,547,521 B1 | 1/2020 | Roy et al. |
| 2004/0236880 A1 | 11/2004 | Barrett |
| 2008/0141261 A1 | 6/2008 | Machida |
| 2012/0131095 A1 | 5/2012 | Luna et al. |
| 2013/0246350 A1 | 9/2013 | Thomas et al. |
| 2015/0181617 A1 | 6/2015 | Luna |
| 2015/0358236 A1 | 12/2015 | Roach et al. |
| 2019/0238442 A1* | 8/2019 | McCarthy ............. H04L 43/022 |
| 2019/0306796 A1* | 10/2019 | Yagi ................... H04W 56/0015 |
| 2020/0112500 A1 | 4/2020 | Wang et al. |
| 2020/0150734 A1* | 5/2020 | Ma ........................ G06F 21/606 |

OTHER PUBLICATIONS

Hristo Trifonov, "Traffic-Aware Adaptive Polling Mechanism for High Performance Packet Processing", Department of Electronic & Computer Engineering Research Report, University of Limerick, 2017.

* cited by examiner

*Primary Examiner* — Jung H Park
(74) *Attorney, Agent, or Firm* — SU IP Consulting (57) ABSTRACT

Example methods and systems for adaptive polling. One example may comprise operating in a polling mode to poll, from a network interface, zero or more packets that require packet processing by the network device. The method may also comprise: in response to detecting a non-zero polling round, adjusting a polling parameter to delay switching from the polling mode to a sleep mode. The method may further comprise: in response to detecting a zero polling round and determining that a switch condition is satisfied, adjusting a sleep parameter associated with the sleep mode based on traffic characteristic information associated with one or more polling rounds; and switching from the polling mode to the sleep mode in which polling from the network interface is halted based on the sleep parameter.

18 Claims, 6 Drawing Sheets

ADAPTIVE POLLING IN SOFTWARE-DEFINED NETWORKING (SDN) ENVIRONMENTS

BACKGROUND

Virtualization allows the abstraction and pooling of hardware resources to support virtual machines in a Software-Defined Networking (SDN) environment, such as a Software-Defined Data Center (SDDC). For example, through server virtualization, virtual machines (VMs) running different operating systems may be supported by the same physical machine (e.g., referred to as a "host"). Each VM is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture. In practice, network device(s) may be deployed in the SDN environment to perform packet processing to facilitate communication among endpoints, such as VMs, etc. However, the network device(s) generally operate in a polling mode that constantly checks for incoming packets, which may not be efficient at all times.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
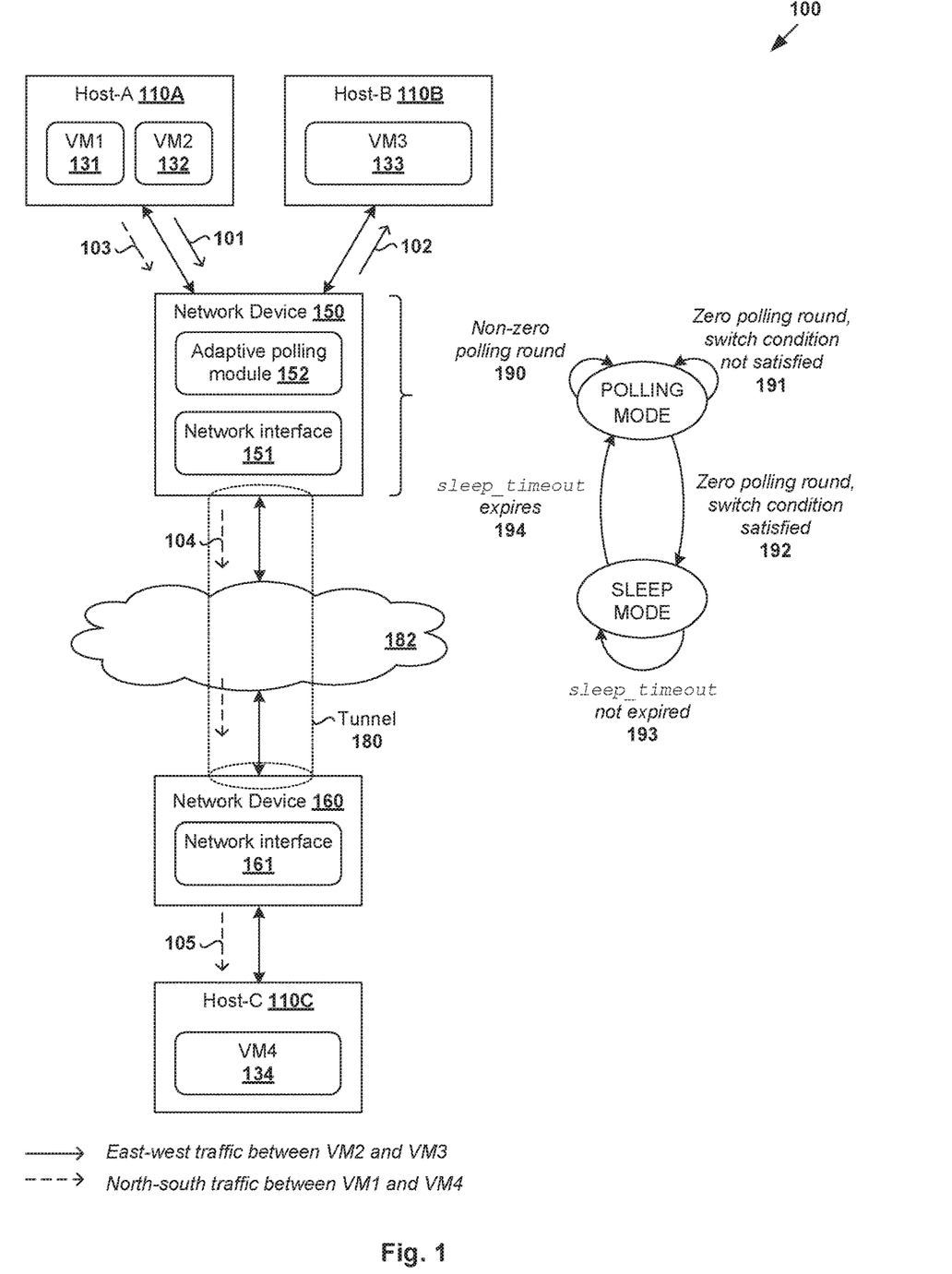
FIG. 1 is a schematic diagram illustrating an example software-defined networking (SDN) environment in which adaptive polling may be performed.
Figure 2:
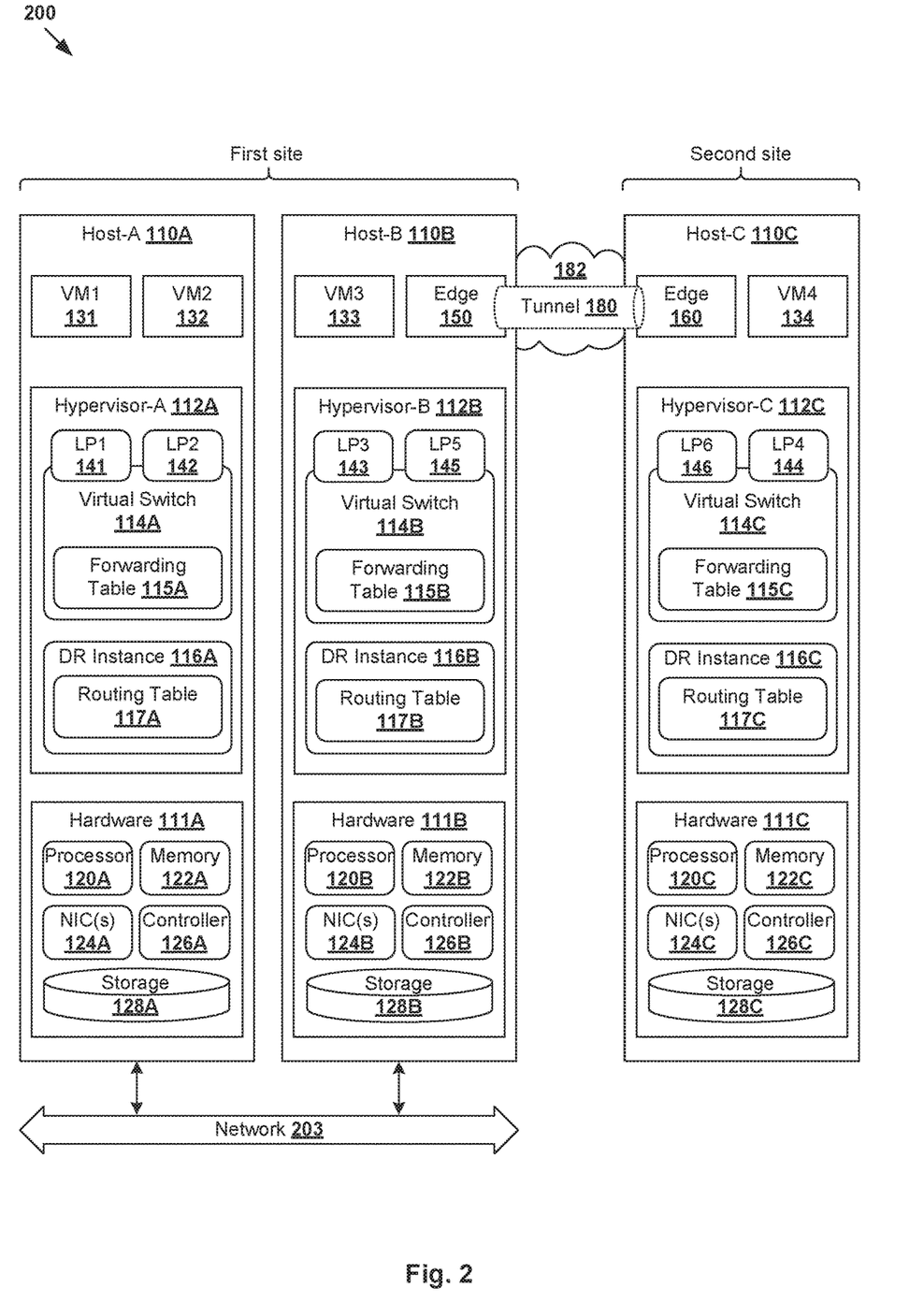
FIG. 2 is a schematic diagram illustrating an example physical view of the SDN environment in FIG. 1.

Challenges relating to packet processing by network devices will now be explained using FIG. 1 and FIG. 2. In particular, FIG. 1 is a schematic diagram illustrating example software-defined networking (SDN) environment 100 in which adaptive polling may be performed. FIG. 2 is a schematic diagram illustrating example physical view 200 of SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

Referring first to FIG. 1, SDN environment 100 includes multiple hosts, such as host-A 110A, host-B 110B and host-C 110C. In practice, hosts 110A-C may be located at geographically dispersed sites, such hosts 110A-B at a first site and host-C 110C at a second site. To facilitate communication among hosts 110A-C over physical network 182, first network device 150 may be deployed at the edge of the first site, and second network device 160 at the edge of the second site. Throughout the present disclosure, the term "network device" (e.g., edge 150/160) may refer generally to an entity that is implemented using one or more virtual machines (VMs) and/or physical machines (also known as "bare metal machines") and capable of performing functionalities of a switch, router, bridge, gateway, edge, any combination thereof, etc.

Referring also to FIG. 2, first network device 150 ("first edge") and second network device 160 ("second edge") may be VMs supported by respective host-B 110B and host-C 110C. Hosts 110A-C may each include suitable hardware and virtualization software (e.g., hypervisors 112A-C) to support various VMs. For example, at the first site, host-A 110A supports VM1 131 and VM2 132, and host-B 110B supports first edge 150 and VM3 133. At the second site, host-B 110B supports second edge 160 and VM4 134. In alternative implementation(s), it should be understood that first edge 150 and/or second edge 160 may each be supported by a different host compared to respective VM3 133 and VM4 134. Host-A 110A and host-C 110C may be connected via any suitable physical network 203.

Hypervisor 112A/112B/112C maintains a mapping between underlying hardware 111A/111B/111C and virtual resources allocated to the VMs. Hardware 111A/111B/111C includes various physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processing unit (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

In practice, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-

C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

The VMs (e.g., VMs 131-134, 150 and 160) may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Through virtualization of networking services in SDN environment 100, logical overlay networks may be provisioned, changed, stored, deleted and restored programmatically without having to reconfigure the underlying physical hardware architecture. Any suitable protocol(s) may be used to facilitate communication via logical overlay networks, Generic Routing Encapsulation (GRE), Internet Protocol Security (IPSec), Virtual eXtensible Local Area Network (VXLAN), Stateless Transport Tunneling (STT), Virtual Local Area Network (VLAN), Generic Network Virtualization Encapsulation (GENEVE), Network Virtualization using Generic Routing Encapsulation (NVGRE), Layer 2 Tunneling Protocol (L2TP), any combination thereof, etc.

In a first example (see 101-102 in FIG. 1), east-west traffic between VM2 132 on host-A 110A and VM3 133 on host-B 110B may be forwarded via network device 150 in the form of an edge, a service node (e.g., service VM), or any other network device, etc. In practice, multiple service nodes (not shown for simplicity) may form a "service chain" or "service path." Each service node may be configured to implement any suitable networking or non-networking service(s). Example networking services include firewall, load balancing, network address translation (NAT), intrusion detection, deep packet inspection, traffic shaping, traffic optimization, packet header enrichment or modification, packet tagging, or any combination thereof, etc.

In a second example (see 103-105 in FIG. 1), north-south traffic between VM1 131 on host-A 110A at a first site and VM4 134 on host-C 110C at a second site may be forwarded via respective first edge 150 and second edge 160. In practice, edge 150/160 may each implement a logical service router (SR), which represents a centralized routing component for providing centralized stateful services such as firewall, load balancing, NAT, etc. Depending on the desired implementation, first edge 150 and second edge 160 may communicate via a Virtual Private Network (VPN), such as Layer-2 VPN (L2VPN), Layer-3 VPN (L3VPN), etc. In this case, tunnel 180 may be established using any suitable protocol(s) to facilitate packet forwarding over physical network 182. First edge 150 and second edge 160 may be connected via any suitable intermediate device(s) in physical network 182.

In practice, any suitable data-plane packet processing engine(s) may be implemented to perform packet processing at network device 150/160. One example is the Data Plane Development Kit (DPDK) that provides a set of data plane libraries and (physical or virtual) NIC drivers to accelerate fast packet processing at network device 150/160. However, DPDK-based data plane implements a packet sampling scheme that usually has a high polling frequency. In this case, network device 150/160 may constantly attempt to poll packets from queue(s) of network interface 151/161, regardless of whether there are packets available. This mode of operation is called polling mode, which necessitates a (physical or virtual) CPU of network device 150/160 to run at substantially 100% utilization.

Conventionally, heuristics-based approaches have been proposed to improve efficiency. One conventional approach is to switch from a polling mode to an interrupt mode after a number of zero-polling rounds where no packet is polled (e.g., ten zero-polling rounds). Unlike the polling mode, the interrupt mode only "wakes up" the CPU when packets are received and ready for polling, thereby reducing CPU utilization. However, some network devices may lack interrupt support. For example, network device 150/160 may rely on network interface 151/161 in the form of kernel NIC interface (KNI) that does not support the interrupt mode.

Conventionally, without the interrupt support, it is generally necessary for network device 150/160 to maintain a constant polling mode. The polling mode is useful for throughput when the traffic load is heavy, but is resource-inefficient when the traffic load is light. For example in FIG.

2, when deployed in a VM form, network device 150 shares CPU resources with other VMs (e.g., VM3 133) running on the same hypervisor-B 110B. Occupying the CPU at 100% (in the polling mode) without presence of heavy traffic is a waste of shared CPU resources. In this case, packet processing performance at network device 150/160, as well as the overall network performance, may be affected.

Adaptive Polling

According to examples of the present disclosure, packet processing may be performed in an improved manner using an adaptive approach. Instead of operating in a constant polling mode, network device 150/160 that lacks interrupt support (i.e., unable to operate in an interrupt mode) may switch between the polling mode and a sleep mode. Using a traffic-aware approach, polling parameter(s) associated with the polling mode and/or sleep parameter(s) associated with the sleep mode may be adjusted dynamically at run time.

According to examples of the present disclosure, network device 150/160 (e.g., data-plane thread) may operate in the polling mode for as long as possible to optimize throughput. Once a switch condition is satisfied, however, network device 150/160 may switch to the sleep mode to reduce CPU utilization. In contrast with the interrupt mode, it should be understood that the sleep mode does not "wake up" the CPU when packets are received. Instead, the sleep mode may be maintained for the duration of a sleep time (denoted as sleep_timeout in FIG. 1). This has the effect of inserting a delay between polling rounds to reduce poling frequency and therefore CPU utilization. This way, CPU resources may be utilized more efficiently to improve the overall performance.

Figure 3:
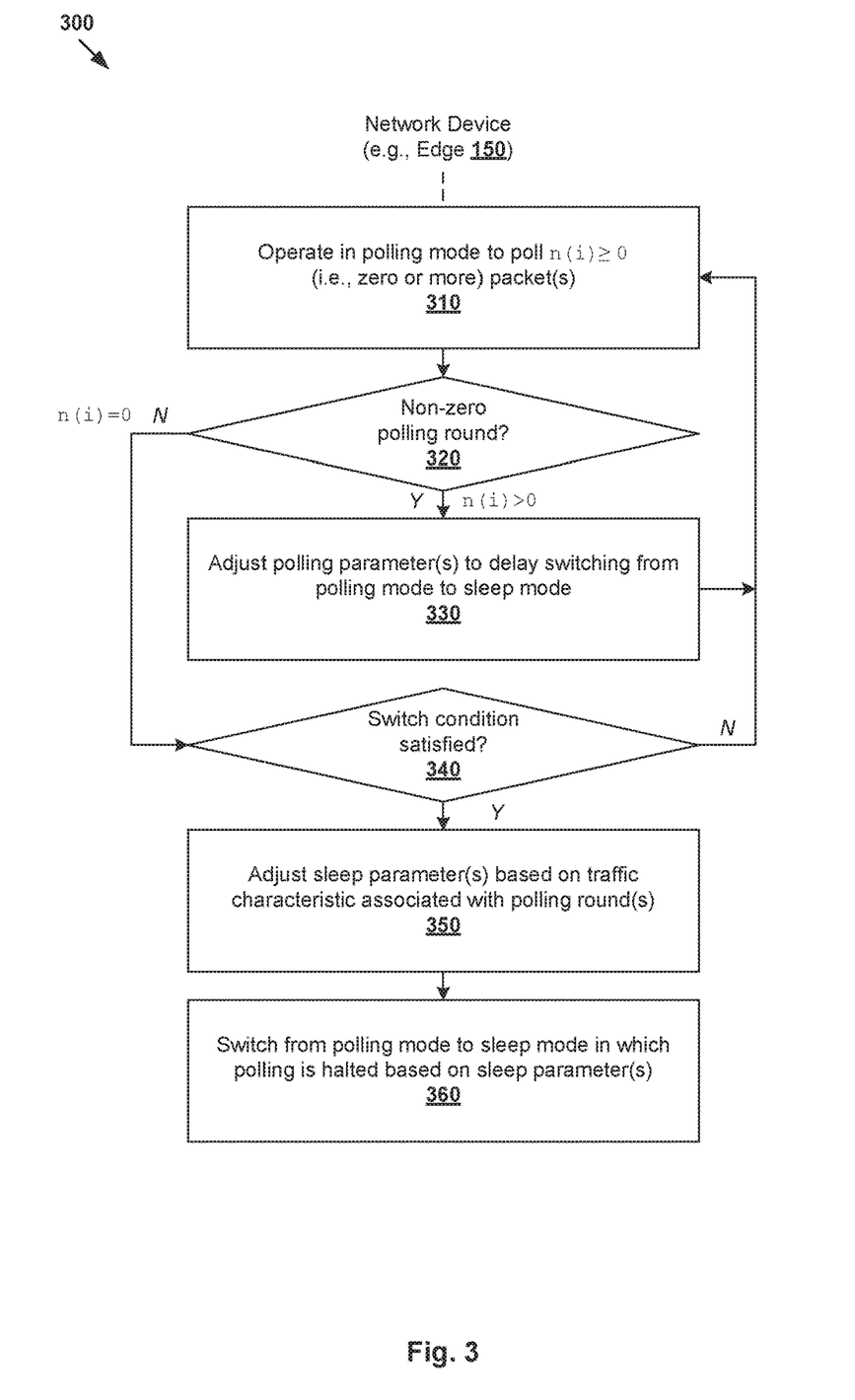
FIG. 3 is a flowchart of an example process for a network device to perform adaptive polling in an SDN environment.

In more detail, FIG. 3 is a flowchart of example process 300 for a network device to perform adaptive polling in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. Throughout the present disclosure, various examples will be explained using network device 150 (e.g., using adaptive polling module 152) that facilitate communication between a pair of nodes or virtualized computing instances. Examples include east-west traffic between VM2 132 and VM3 133 (see 101-102) and north-south traffic between VM1 131 and VM4 134 (see 103-105) in FIG. 1. The term "non-zero polling round" may refer generally to a round or iteration in which one or more packets are polled. The term "zero polling round" may refer generally to a round or iteration in which zero packet is polled.

At 310 in FIG. 3, network device 150 may operate in a polling mode to poll, from network interface 151, zero or more packets that require packet processing by network device 150. At 320 (yes) and 330, in response to detecting a non-zero polling round (i.e., a round in which one or more packets are polled), network device 150 may adjust a polling parameter to delay switching from the polling mode to a sleep mode. See also 190 in FIG. 1. As will be explained using FIGS. 5-6, the "polling parameter" may be any suitable parameter to dynamically adjust the polling mode, such as the number of allowable zero polling rounds (e.g., allowable_zero_rounds) before switching to the sleep mode. In practice, adjusting allowable_zero_rounds has the effect of increasing or reducing a delay between two sleep modes.

At 320 (no), 340 (yes) and 350 in FIG. 3, in response to detecting a zero polling round (i.e., a round in which zero packet is polled) and determination that a switch condition is satisfied, network device 150 may adjust a sleep parameter associated with the sleep mode based on traffic characteristic information associated with one or more polling rounds. At 360, network device 150 may switch from the polling mode to the sleep mode in which polling from network interface 151 is halted based on the sleep parameter. See also 191 (switch condition not satisfied) and 192 (switch condition satisfied) in FIG. 1. After a period of time (e.g., sleep_timeoout has expired), network device 150 may switch to the polling mode. See also 193 (sleep mode maintained) and 194 (switching to polling mode) in FIG. 1.

As will be explained using FIGS. 5-6, the "switch condition" at block 340 may be any suitable condition, such as whether the number of allowable zero polling rounds (e.g., allowable_zero_rounds) has been reached. The "sleep parameter" at block 350 may be any suitable parameter to dynamically adjust the sleep mode, such as a sleep time (e.g., sleep_timeoout in FIG. 1) during which the sleep mode is maintained. In practice, adjusting sleep_timeoout has the effect of increasing or reducing a delay between consecutive polling rounds. The "traffic characteristic information" may include any suitable information associated with traffic dynamics, such as a flag to indicate whether a non-zero polling round is detected prior to switching to the sleep mode (e.g., pkt_polled_flag). Any alternative and/or additional polling parameter(s), switch condition(s), sleep parameter(s) and traffic characteristic information may be used.

Example Network Interface

Figure 4:
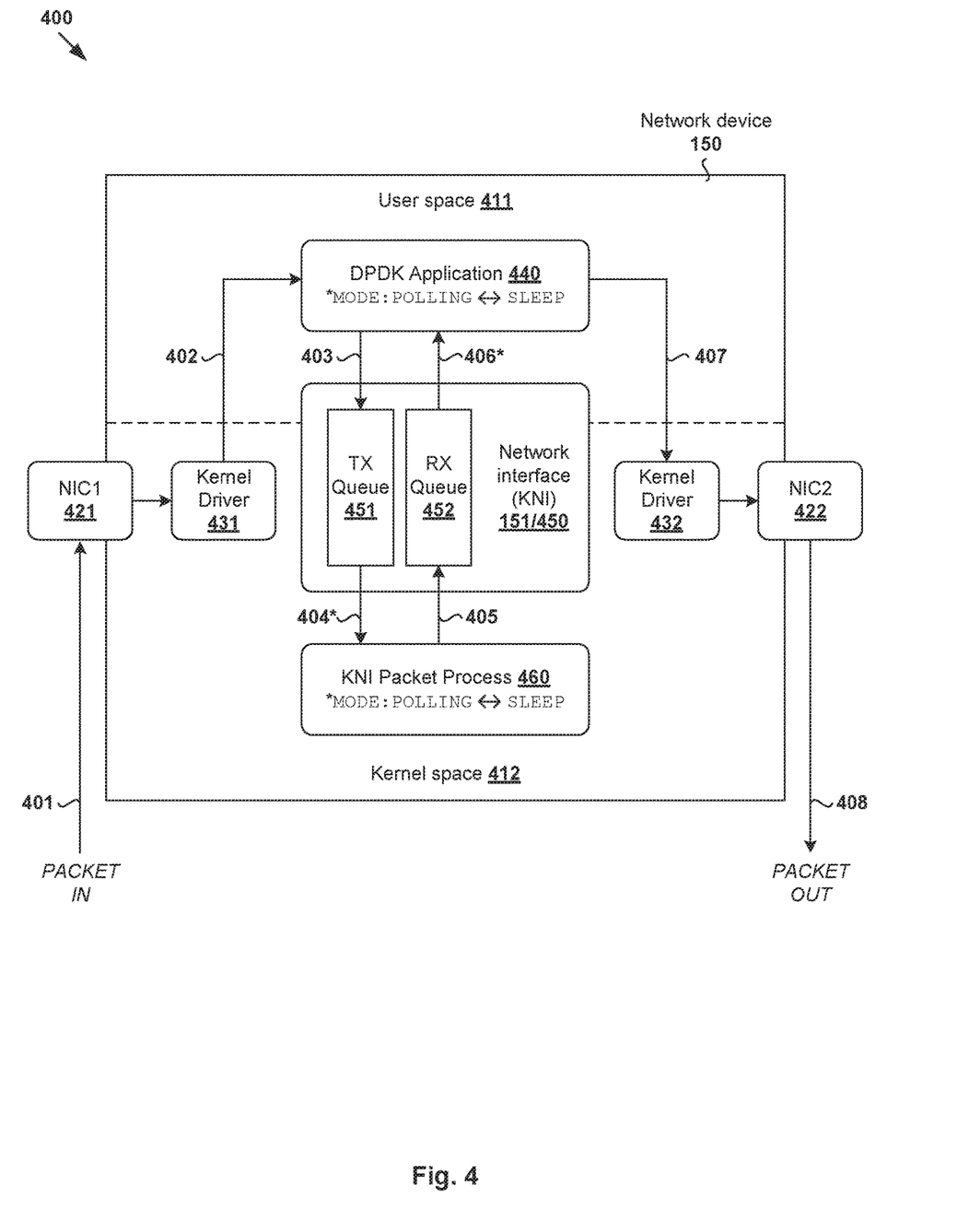
FIG. 4 is a schematic diagram illustrating an example architecture of a network device configured to perform adaptive polling in an SDN environment.

FIG. 4 is a schematic diagram illustrating example architecture 400 of network device 150 configured to perform adaptive polling in SDN environment 100. It should be understood that, depending on the desired implementation, example architecture 400 may include additional and/or alternative components than that shown in FIG. 4. In the example in FIG. 4, network device 150 may support any suitable packet processing engines, such as DPDK application 440 residing in user space 411 and KNI packet process 460 residing in kernel space 412. Traffic that travels between DPDK application 440 and KNI packet process 460 is handled by network interface 151/450 (e.g., KNI). Network interface 450 supports transmit (TX) and receive (RX) queues 451-452, which may be shared-memory-based queues that are accessible by both DPDK application 440 and KNI packet process 460. Packet processing by network device 150 will be explained using 401-408 below.

In more detail, at 401-402, in response to detecting a packet at first NIC1 421, the packet may be directed to DPDK application 440 in user space 411. At 403, DPDK application 440 may direct the packet to network interface 450 via TX queue 451. At 404-405, KNI packet process 460 may operate in a polling mode to poll packet(s) from TX queue 451 before performing any necessary packet processing and pushing the packet(s) into RX queue 452 of network interface 450. At 406, DPDK application 440 may operate in a polling mode to poll packet(s) from RX queue for any necessary packet processing. At 407-408, DPDK application 440 may forward packet(s) to second NIC2 422. It should be noted that a particular ingress packet (see 401-404) is not necessarily the same as an egress packet (see 405-408).

According to examples of the present disclosure, kernel-space KNI packet process 460 may implement adaptive polling when polling packet(s) from TX queue 451 (see 404*). Additionally or alternatively, user-space DPDK application 440 may implement adaptive polling when polling packet(s) from RX queue 452 (see 406*). This is especially useful when network interface 450 (e.g., KNI) lacks any interrupt support. Instead of maintaining a constant polling mode, DPDK application 440 and/or KNI packet process 460 may switch between the polling mode and the sleep mode to reduce CPU utilization when traffic load is relatively light. This way, wastage of CPU resources may be reduced because it is not necessary to maintain the constant polling mode. Various examples of adaptive polling will be explained below using FIGS. 5-6.

Detailed Examples

Figure 5:
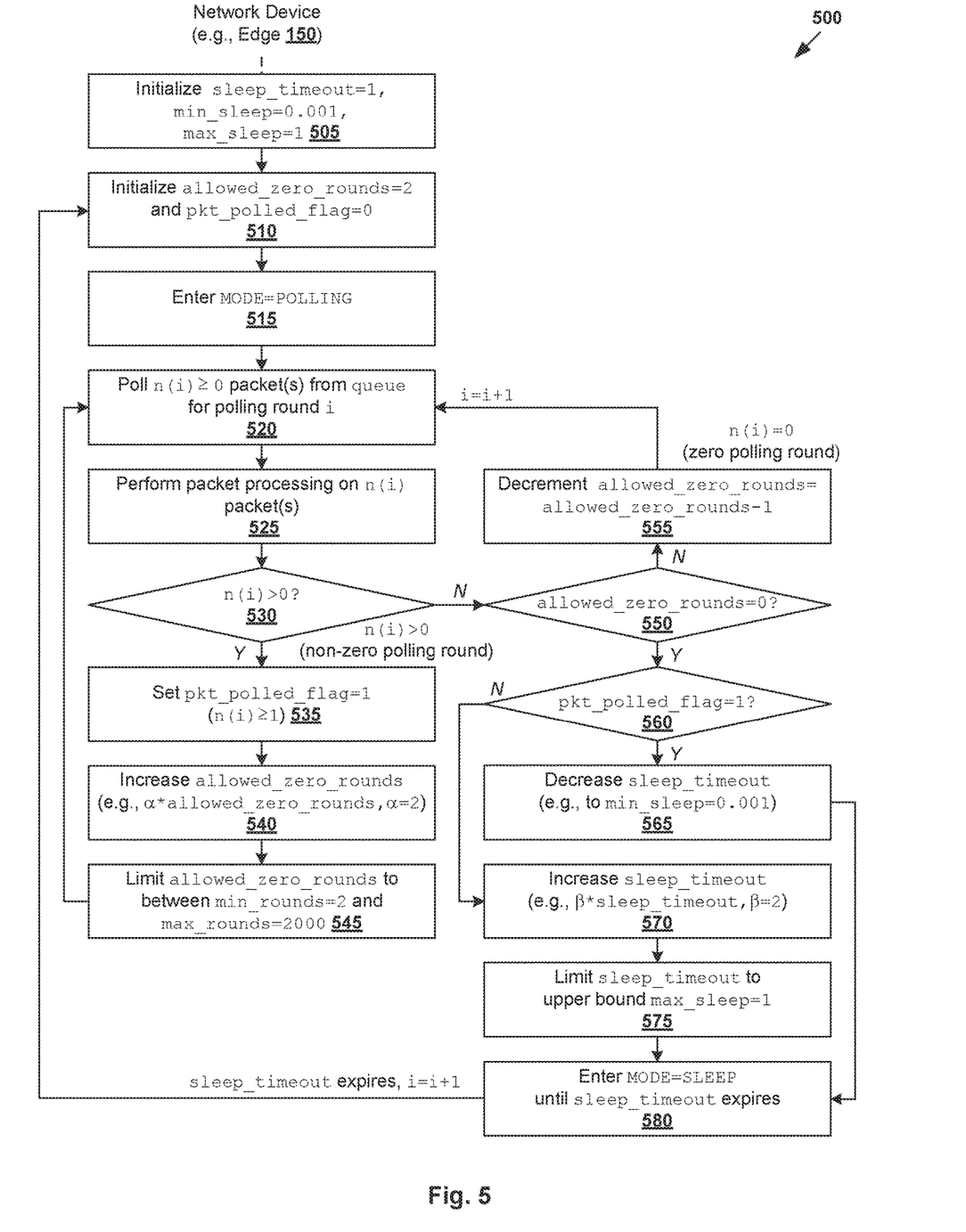
FIG. 5 is a flowchart of an example detailed process for a network device to perform adaptive polling in an SDN environment.

FIG. 5 is a flowchart of example detailed process 500 for a network device to perform adaptive polling in SDN environment 100. Example process 500 may include one or more operations, functions, or actions illustrated by one or more blocks, such as 505 to 580. The various blocks may be combined into fewer blocks, divided into additional blocks, and/or eliminated depending on the desired implementation. Various examples below may be performed by network device 150 using user-space DPDK application 440 and/or kernel-space KNI packet process 460 in FIG. 4. The example in FIG. 5 will be explained using FIG. 6A and FIG. 6B. FIG. 6A is a schematic diagram illustrating an example of network device 150 switching from a polling mode to a sleep mode according to the example in FIG. 5. FIG. 6B is a schematic diagram illustrating an example of network device 150 switching from a sleep mode to a polling mode according to the example in FIG. 5.

(a) Initialization

At 505 in FIG. 5, sleep parameter(s) associated with the sleep mode may be initialized. For example, sleep_timeout is a parameter for configuring a sleep time during which the sleep mode is maintained. Increasing sleep_timeout has the effect of extending the sleep time and delaying a switch back to the polling mode. In contrast, decreasing sleep_timeout has the opposite effect of reducing the sleep time and therefore the delay from switching back to polling mode. A lower bound and an upper bound may also be set for each sleep parameter, such that sleep_timeout is adjustable between min_sleep=0.001 ms (i.e., lower bound) and max_sleep=1 ms (i.e., upper bound) based on traffic dynamics.

At 510 in FIG. 5, polling parameter(s) associated with the polling mode may be initialized. For example, allowable_zero_rounds is a parameter for configuring the number of zero polling rounds that are allowed a switching to the sleep mode is performed. Increasing allowable_zero_rounds has the effect of increasing a delay from switching from the polling mode to the switch mode when zero packet is polled. Decreasing allowable_zero_rounds has the opposite effect of reducing the delay. Similarly, a lower bound and an upper bound may be set for each polling parameter, such that allowable_zero_rounds is adjustable between min_rounds=2 (i.e., lower bound) and max_rounds=2000 (i.e., upper bound) based on traffic dynamics.

Also at 510 in FIG. 5, parameter pkt_polled_flag may be initialized to indicate whether a non-zero polling round has occurred (i.e., pkt_polled_flag=1) or otherwise (i.e., pkt_polled_flag=0) prior to a switch to the sleep mode. As will be described below, the flag may be used as "traffic characteristic information" based on which sleep_timeout is adjustable. In practice, any additional and/or alternative "traffic characteristic information" may be tracked, such as the number of packets polled within a particular timeframe, the number of non-zero polling rounds that have been detected prior to a switch to the sleep mode, etc.

At 515 and 520 in FIG. 5, DPDK application 440 and/or KNI packet process 460 may operate in the polling mode to poll zero or more packets from packet queue 452/451 supported by network interface 450. For the $i^{th}$ polling round, the number of packets polled may be denoted as n(i), where n(i)=0 indicates a zero polling round and n(i)>0 a non-zero polling round. At 525 in FIG. 5, any suitable packet processing may be performed on the detected packets in the case of n(i)>0.

(b) Non-Zero Polling Rounds

At 530 in FIG. 5, in response to determination that n(i)>0 and the current polling round i is a non-zero polling round, blocks 535-545 may be performed. In particular, block 535 involves setting pkt_polled_flag=1 to indicate that at least one packet has been polled. Block 540 may involve adjusting allowed_zero_rounds to increase the number of allowable zero polling rounds prior to switching to the sleep mode. Where necessary, block 545 may involve limiting allowed_zero_rounds between min_rounds=10 and max_rounds=10000. In practice, any suitable increase rate may be used, such as allowed_zero_rounds=allowed_zero_rounds*α, where α>1.

Figure 6A:
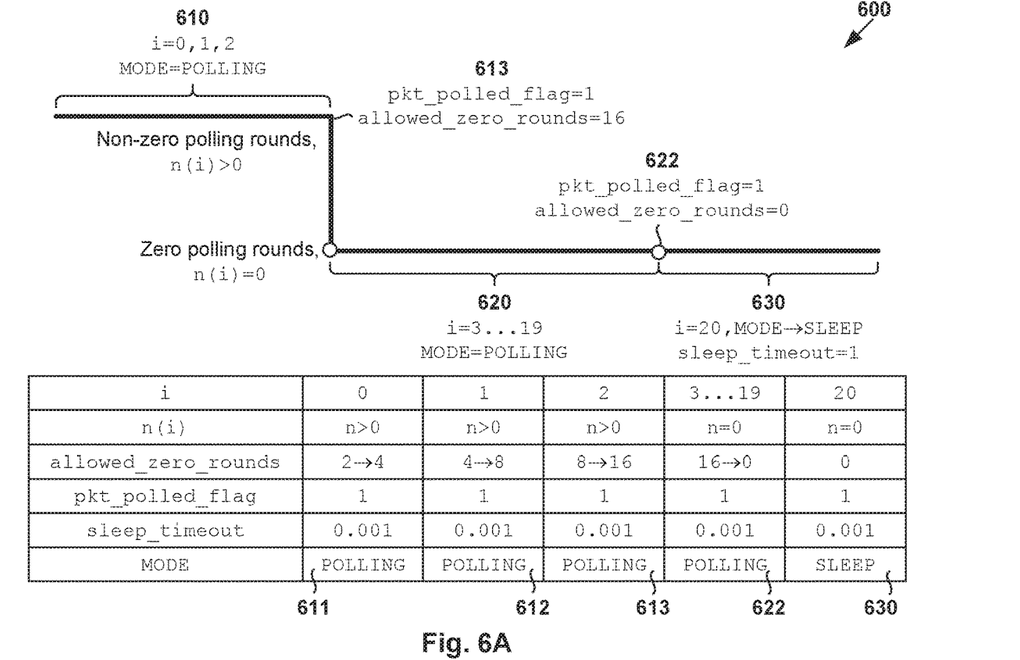
FIG. 6A is a schematic diagram illustrating an example of a network device switching from a polling mode to a sleep mode according to the example in FIG. 5.

Referring first to 610 in FIG. 6A, consider a scenario where several consecutive non-zero polling rounds are detected. In this case, pkt_polled_flag=1 may be set during a non-zero polling round according to block 535. At each non-zero polling round, allowed_zero_rounds may be adjusted to delay switching to the sleep mode, such as based on the expectation that additional packet(s) may be polled in the near future. Using α>2 (i.e., exponential increase), allowed_zero_rounds may be doubled from min_rounds=2 to 4 at round i=0 (see 611), and then 8 at round i=1 (see 612). At the end of round i=2, allowed_zero_rounds=16 (see 613). In practice, any suitable polling frequency (i.e., how often polling is performed) may be configured, such as based on the underlying software code implementation, CPU capability, etc.

(c) Zero Polling Rounds

Alternatively, in response to determination that n(i)=0 and the current polling round i is a zero polling round, a decision as to whether to switch to the sleep mode may be made. At 550 (no) in FIG. 5, in response to determination that the number of allowable zero polling rounds has not been reached (i.e., allowed_zero_rounds>0), the polling mode is maintained instead of switching to the sleep mode. In this case, at 555 in FIG. 5, allowed_zero_rounds may be decremented, i.e. allowed_zero_rounds=allowed_zero_rounds−1.

Referring to 620 in FIG. 6A, consider a scenario where several zero polling rounds are detected. At each zero polling round, allowed_zero_rounds is decremented, such as from allowed_zero_rounds=16 to zero after 16 zero polling rounds (see 622) according to blocks 550-555. In this example, even when zero packet is polled, the polling mode is maintained for at least a number of rounds instead of immediately switching to the sleep mode.

(d) Switching to Sleep Mode

At 550 (yes) in FIG. 5, in response to detecting that allowed_zero_rounds has been decremented to zero, it is determined that a switch condition has been satisfied (related to block 340 in FIG. 3). At 565-580 in FIG. 5, sleep_timeout may be adjusted before entering the sleep mode for the duration of sleep_timeout. For example, sleep_timeout may be adjusted according to block 565 or 570 based on traffic characteristic information (e.g., pkt_polled_flag).

At 560 (yes) and 565 in FIG. 5, in response to determination that pkt_polled_flag=1, sleep_timeout may be set to a lower bound (e.g., min_sleep=0.001). Otherwise (i.e., pkt_polled_flag=0), sleep_timeout may be adjusted to increase sleep_timeout according to 560 (no) and 565 in FIG. 5. Any suitable increase rate may be used, such as sleep_timeout=sleep_timeout*β, where β>1. Using β=2 for example, sleep_timeout will be increased exponentially based on a lower expectation that packets will be polled once a zero polling round is detected.

Referring to 630 in FIG. 6A, consider a scenario where network device 150 switches from the polling mode to the sleep mode at round i=20. At the zero polling round, sleep_timeout may be adjusted according to traffic dynamics based on pkt_polled_flag. Since pkt_polled_flag=1 (see 622), the sleep mode is configured for a shorter period of time (e.g., min_sleep=0.001 ms) according to block 565.

(e) Switching to Polling Mode

Figure 6B:
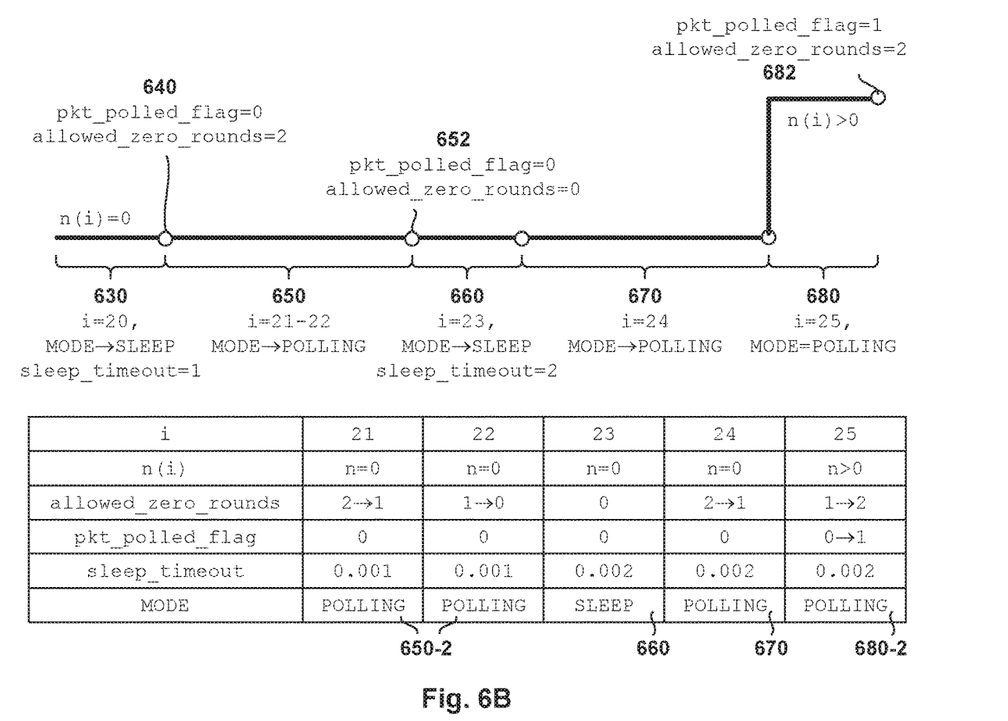
FIG. 6B is a schematic diagram illustrating an example of a network device switching from a sleep mode to a polling mode according to the example in FIG. 5.

Referring now to 640 in FIG. 6B, once sleep_timeout has elapsed, various parameters are re-initialized, including allowed_zero_rounds=2 and pkt_polled_flag=0 according to block 510. Network device 150 then re-enters the polling mode according to block 515. In particular, at 650, a minimum of allowed_zero_rounds=2 polling rounds are performed, even when no packet is polled from network interface 450. At each zero polling round, allowed_zero_rounds will be decremented (see 652).

At 660 in FIG. 6B, it is determined that a switch condition is satisfied at round i=23 based on allowed_zero_rounds=0. Since pkt_polled_flag=0, sleep_timeout may be increased from 0.001 to 0.002 to insert a longer delay between consecutive polling rounds according to block 570. At 670, network device 150 re-enters the polling mode at round i=24 where no packet is polled and allowed_zero_rounds is decremented by 1. At 680, however, a non-zero polling round is detected. In this case, allowed_zero_rounds is increased based on the expectation that more packets will arrive in the near future. Also, pkt_polled_flag=1 is set to affect how sleep_timeout is adjusted after several zero polling rounds. See also 682.

Based on the above examples, adaptive polling may be implemented by dynamically adjusting allowed_zero_rounds ("polling parameter") and sleep_timeout ("sleep parameter"). Parameter allowed_zero_rounds may be adjusted to configure the number of allowable zero polling rounds before DPDK application 440 and/or KNI packet process 460 switches to the sleep mode. Parameter sleep_timeout may be adjusted to configure the sleep time of DPDK application 440 and/or KNI packet process 460 before packet polling is performed again. Dynamic adjustment of the polling and sleep parameters may be performed to improve performance, such as to achieve traffic processing throughput that is substantially on par with a busy-polling scheme. Further, during light or no traffic load, CPU utilization may be reduced, such as to almost idle (e.g., around 1%).

Container Implementation

Although discussed using VMs 131-134, it should be understood that adaptive polling may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11 s of Gigabytes (GB). This makes containers more light-weight, portable, efficient and suitable for delivery into an isolated OS environment. Running containers inside a VM (known as "containers-on-virtual-machine" approach) not only leverages the benefits of container technologies but also that of virtualization technologies. Using the examples in FIGS. 1-6B, adaptive polling may be performed to facilitate communication among containers in SDN environment 100.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6B. For example, a computer system capable of acting as a network device may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network device to perform adaptive polling, wherein the method comprises:
   operating in a polling mode to poll, from a network interface of the network device, zero or more packets that require packet processing by the network device;
   in response to detecting a non-zero polling round, being a round in which one or more packets are polled, adjusting a polling parameter to delay switching from the polling mode to a sleep mode; and
   in response to detecting a zero polling round, being a round in which zero packet is polled, and determining that a switch condition is satisfied,
      adjusting a sleep parameter associated with the sleep mode based on traffic characteristic information associated with one or more polling rounds, wherein the sleep parameter includes a sleep time, adjustable between an upper bound and a lower bound, during which the sleep mode is maintained before switching from the sleep mode to the polling mode; and
      switching from the polling mode to the sleep mode in which polling from the network interface is halted based on the sleep parameter.

2. The method of claim 1, wherein adjusting the polling parameter comprises:
   increasing the polling parameter that includes a number of allowable zero polling rounds to delay switching to the sleep mode, wherein the number of allowable zero polling rounds is adjustable between an upper bound and a lower bound.

3. The method of claim 2, wherein determination that the switch condition is satisfied comprises:
   determining that the number of allowable zero polling rounds has been reached.

4. The method of claim 1, wherein adjusting the sleep parameter comprises:
   identifying the traffic characteristic information that includes a flag indicating whether a non-zero polling round has been detected prior to the zero polling round; and
   in response to determination that the flag indicates that the non-zero polling round has been detected, increasing the sleep time to delay switching from the sleep mode to the polling mode; but otherwise, limiting the sleep time to the lower bound.

5. The method of claim 1, wherein switching to the sleep mode comprises:
   switching, by a user-space packet processing engine supported by the network device, to the sleep mode by halting polling from a first packet queue of the network interface, wherein the network interface lacks interrupt support.

6. The method of claim 1, wherein switching from the polling mode to the sleep mode comprises:
   switching, by a kernel-space packet processing engine supported by the network device, to the sleep mode by halting polling from a second packet queue of the network interface, wherein the network interface lacks interrupt support.

7. A non-transitory computer-readable storage medium that includes a set of instructions which, in response to execution by a processor of a network device, cause the processor to perform a method of adaptive polling, wherein the method comprises:
   operating in a polling mode to poll, from a network interface of the network device, zero or more packets that require packet processing by the network device;
   in response to detecting a non-zero polling round, being a round in which one or more packets are polled, adjusting a polling parameter to delay switching from the polling mode to a sleep mode; and
   in response to detecting a zero polling round, being a round in which zero packet is polled, and determining that a switch condition is satisfied,
      adjusting a sleep parameter associated with the sleep mode based on traffic characteristic information associated with one or more polling rounds, wherein the sleep parameter includes a sleep time, adjustable between an upper bound and a lower bound, during which the sleep mode is maintained before switching from the sleep mode to the polling mode; and
      switching from the polling mode to the sleep mode in which polling from the network interface is halted based on the sleep parameter.

8. The non-transitory computer-readable storage medium of claim 7, wherein adjusting the polling parameter comprises:
   increasing the polling parameter that includes a number of allowable zero polling rounds to delay switching to the sleep mode, wherein the number of allowable zero polling rounds is adjustable between an upper bound and a lower bound.

9. The non-transitory computer-readable storage medium of claim 8, wherein the determination that the switch condition is satisfied comprises:
   determining that the number of allowable zero polling rounds has been reached.

10. The non-transitory computer-readable storage medium of claim 7, wherein adjusting the sleep parameter comprises:
    identifying the traffic characteristic information that includes a flag indicating whether a non-zero polling round has been detected prior to the zero polling round; and
    in response to determination that the flag indicates that the non-zero polling round has been detected, increasing the sleep time to delay switching from the sleep mode to the polling mode; but otherwise, limiting the sleep time to the lower bound.

11. The non-transitory computer-readable storage medium of claim 7, wherein switching to the sleep mode comprises:
    switching, by a user-space packet processing engine supported by the network device, to the sleep mode by halting polling from a first packet queue of the network interface, wherein the network interface lacks interrupt support.

12. The non-transitory computer-readable storage medium of claim 7, wherein switching from the polling mode to the sleep mode comprises:
    switching, by a kernel-space packet processing engine supported by the network device, to the sleep mode by halting polling from a second packet queue of the network interface, wherein the network interface lacks interrupt support.

13. A computer system configured to perform adaptive polling, wherein the computer system comprises:
a processor;
a network interface from which zero or more packets are polled; and
a non-transitory computer-readable medium having stored thereon instructions that, when executed by the processor, cause the processor to:
operate in a polling mode to poll, from the network interface, zero or more packets that require packet processing;
in response to detecting a non-zero polling round, being a round in which one or more packets are polled, adjust a polling parameter to delay switching from the polling mode to a sleep mode; and
in response to detecting a zero polling round, being a round in which zero packet is polled, and determining that a switch condition is satisfied,
adjust a sleep parameter associated with the sleep mode based on traffic characteristic information associated with one or more polling rounds, wherein the sleep parameter includes a sleep time, adjustable between an upper bound and a lower bound, during which the sleep mode is maintained before switching from the sleep mode to the polling mode; and
switch from the polling mode to the sleep mode in which polling from the network interface is halted based on the sleep parameter.

14. The computer system of claim 13, wherein the instructions for adjusting the polling parameter cause the processor to:
increase the polling parameter that includes a number of allowable zero polling rounds to delay switching to the sleep mode, wherein the number of allowable zero polling rounds is adjustable between an upper bound and a lower bound.

15. The computer system of claim 14, wherein the instructions for the determination that the switch condition is satisfied cause the processor to:
determine that the number of allowable zero polling rounds has been reached.

16. The computer system of claim 13, wherein the instructions for adjusting the sleep parameter cause the processor to:
identify the traffic characteristic information that includes a flag indicating whether a non-zero polling round has been detected prior to the zero polling round; and
in response to determination that the flag indicates that the non-zero polling round has been detected, increase the sleep time to delay switching from the sleep mode to the polling mode; but otherwise, limiting the sleep time to the lower bound.

17. The computer system of claim 13, wherein the instructions for switching to the sleep mode cause the processor to:
switch, by a user-space packet processing engine, to the sleep mode by halting polling from a first packet queue of the network interface, wherein the network interface lacks interrupt support.

18. The computer system of claim 13, wherein the instructions for switching from the polling mode to the sleep mode cause the processor to:
switch, by a kernel-space packet processing engine, to the sleep mode by halting polling from a second packet queue of the network interface, wherein the network interface lacks interrupt support.

* * * * *